United States Patent
Chen et al.

(10) Patent No.: US 12,116,544 B2
(45) Date of Patent: Oct. 15, 2024

(54) METAL WORKING FLUIDS FOAM CONTROL AGENT

(71) Applicant: Dow Global Technologies LLC, Midland, MI (US)

(72) Inventors: Xue Chen, Manvel, TX (US); Lixin You, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 18/248,156

(22) PCT Filed: Oct. 26, 2020

(86) PCT No.: PCT/CN2020/123535
§ 371 (c)(1),
(2) Date: Apr. 6, 2023

(87) PCT Pub. No.: WO2022/087764
PCT Pub. Date: May 5, 2022

(65) Prior Publication Data
US 2024/0026241 A1    Jan. 25, 2024

(51) Int. Cl.
| | | |
|---|---|---|
| *C10M 129/06* | (2006.01) | |
| *B23Q 11/10* | (2006.01) | |
| *C10M 173/02* | (2006.01) | |
| *C10N 30/18* | (2006.01) | |
| *C10N 40/20* | (2006.01) | |

(52) U.S. Cl.
CPC ....... *C10M 129/06* (2013.01); *B23Q 11/1061* (2013.01); *C10M 173/02* (2013.01); *C10M 2207/021* (2013.01); *C10N 2030/18* (2013.01); *C10N 2040/20* (2013.01)

(58) Field of Classification Search
CPC .............. C10M 129/06; C10M 173/02; C10M 2207/021; B23Q 11/1061; C10N 2030/18; C10N 2040/20
See application file for complete search history.

(56) References Cited

U.S. PATENT DOCUMENTS

| | | | |
|---|---|---|---|
| 4,339,342 A | 7/1982 | Hempel et al. | |
| 5,360,560 A | 11/1994 | Schmid et al. | |
| 7,348,460 B2 | 3/2008 | Wulff et al. | |
| 9,381,450 B2 | 7/2016 | Lang et al. | |
| 2011/0287993 A1 * | 11/2011 | Shibata ................ | C10M 105/12 508/583 |

FOREIGN PATENT DOCUMENTS

| | | | |
|---|---|---|---|
| CN | 106479654 | 3/2017 | |
| CN | 107034003 | 8/2017 | |
| CN | 107502910 | 12/2017 | |
| CN | 111013201 A | 4/2020 | |
| EP | 0484542 A1 * | 11/1995 | .......... C10M 101/02 |
| JP | 2005330236 | * 12/2005 | |

OTHER PUBLICATIONS

PCT/CN2020/123535 International Search Report and Written Opinion with a mailing date of Jul. 29, 2021.
Office Action from corresponding Taiwan Application: 110135170 with a mailing date of Apr. 24, 2023.

* cited by examiner

*Primary Examiner* — Cephia D Toomer

(57) ABSTRACT

A foam control agent and method of controlling foam for metal working fluids by use of a foam control agent, wherein the agent comprises at least a branched alcohol.

3 Claims, No Drawings

METAL WORKING FLUIDS FOAM CONTROL AGENT

Embodiments relate to a foam control agent and method of controlling foam for metal working fluids, wherein the agent comprises at least a branched alcohol.

INTRODUCTION

Metal working fluids (MWFs) are used for lubrication of metal cutting and tool forming. These fluids provide cooling for the metal work tooling, removal of cutting chips from the tool/work piece interface and help provide an acceptable post-machining finished surface. MWFs may be neat oil, soluble oil, semi-synthetic fluid or synthetic fluid. Neat oil and soluble oil contain 50-70 wt. % oil and oil-soluble anti-wear/extreme pressure additives. They provide excellent lubricity but poor cooling efficiency. A synthetic metal working fluid is mainly composed of water with lubricant additives. It provides excellent properties for removing the heat generated during the processing but only average lubricity.

A semi-synthetic fluid differs from soluble oil and synthetic metal working fluids, in that it contains a significant amount of water, but also 10-30 wt. % mineral oil, 10-30 wt. % emulsifiers and other functional additives. Fatty acid ethanolamine soaps, sodium alkane sulfonates, alcohol ethoxylates and other surfactants are used to disperse mineral oil or plant oil into the water and thus provide proper lubricity to the tool metal contacting a work surface. These surface-active agents contribute to the generation of large amounts of foam during the metal working process, which causes insufficient liquid lubricity between the tool and the working piece. In some cases, this lack of lubricity can cause liquid overflow from the fluid bath. Some machining processes (especially grinding) are very sensitive to foam and require particular care when planning the processing.

Silicone based foam control agents are widely used in MWFs to address the foaming issue due to these agents very low surface tension and insolubilities in both oil and water. However, the biodegradability of silicone defoamers is not good, and they also lack stability in many MWF formulations. Additionally, the deposition of silicone onto the surface of the metal impacts the (smooth) finishing which also creates additional issues for any subsequent painting step(s).

For all these reasons and more, there is a need for a foam control agent and method of controlling foam for metal working fluids.

SUMMARY

Embodiments relate to a foam control agent and method of controlling foam for metal working fluids, wherein the agent comprises at least a branched alcohol.

DETAILED DESCRIPTION

The present disclosure relates to a foam control agent for metal working fluids (MWFs). The present disclosure details how, unexpectedly, branched alcohols have been shown to have superior foam control performance. The branched alcohols may be 2-alkyl-1-alkanols (also known as Guerbet alcohols), and preferably 2-ethylhexanol (2-EH) and 2-propylheptanol (2-PH). The Guerbet alcohols including 2-butyl-1-octanol. These alcohols can be synthesized via the aldol condensation of the corresponding aldehydes or from the Guerbet reaction of primary linear alcohols. Other methods of production may also be utilized.

The generic structure of the antifoaming agent currently disclosed is as follows:

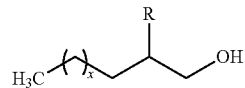

wherein x is an integer from 2 to 14 and R is an alkyl group with 1-14 carbon atoms.

The foam control agent may also be described as comprising a 2-alkyl substituted alcohol from C8-C32. The alcohols can be predominately one isomer (>95 wt. %) or a mixture of alcohols which can be generated by an aldol condensation of a mixture of aldehydes or generated from a mixture of alcohols via the Guerbet reaction.

The C8-C32 Guerbet alcohols including 2-ethylhexanol and 2-propylheptanol and the mixture of C8, C9, and C10 alcohols generated from the aldol condensation of butyraldehyde and valeraldehyde are preferred in some embodiments.

The concentration of the Guerbet alcohol in the formulated foam control agent ranges from 0.01% to 100%, preferably, ranging from 30% to 100%. The Guerbet alcohol can be in the form of a solid or liquid, a liquid is preferred. If it is a solid, the material may be dissolved or dispersed in a solvent. The said foam control agent can be aqueous solution or organic solvent based solution. The usage dosage of the said foam control agent for MWFs may vary. The usage dosage of this foam control agent for MWFs ranges from 0.01% to 5%, preferably, ranges from 0.1% to 1%.

Other foam control agents (e.g., copolymers composed of ethylene oxide, propylene oxide, and/or butylene oxide, random or blocks) or other hydrophobic materials such as waxes, oils or silicas may also be added with the branched, Guerbet alcohol(s). Silicon defoamers can be used in conjunction with the 2-alkyl alcohols. Surfactants, especially alkoxylates of the alcohols can also be used. The use of branched alcohols as foam control agents may be water based or oil based.

The new foam control agent presently disclosed may be in the form of a solid or liquid. If it is a solid, the material may be dissolved or dispersed in a solvent before use as a foam control agent. The presently disclosed agents are believed to work in the presence of all commonly used metal working fluids.

The chemical agent can be used both in antifoamer or defoamer formulations. Antifoamer formulations are obtained by the mixture of polyglycols, esters, silicones, solvents, water and/or other chemicals that in the gas-liquid interface of the bubble avoiding the foam formation. Other amphiphilic chemicals based on block copolymer can be used as well. In defoaming formulations, in addition to the products mentioned above, it can be used vegetable oils, mineral oils, waxes and other oily agents.

The optional surfactant or emulsifier contained in the foam control agent is selected to be suitable for improving the compatibility of the foam control agent on the feedstock or forming an emulsion with the composition of branched alcohol. The optional surfactant or emulsifier has an amount ranging from 0.1-30% by weight of the composition of branched alcohol.

The optional surfactant or emulsifier may be anionic, cationic or nonioic. Examples of suitable anionic surfactants or emulsifiers are alkali metal, ammonium and amine soaps; the fatty acid part of such soaps contains preferably at least 10 carbon atoms. The soaps can also be formed "in situ;" in other words, a fatty acid can be added to the oil phase and an alkaline material to the aqueous phase.

Other examples of suitable anionic surfactants or emulsifiers are alkali metal salts of alkyl-aryl sulfonic acids, sodium dialkyl sulfosuccinate, sulfated or sulfonated oils, e.g., sulfated castor oil; sulfonated tallow, and alkali salts of short chain petroleum sulfonic acids.

Suitable cationic surfactants or emulsifiers are salts of long chain primary, secondary or tertiary amines, such as oleylamide acetate, cetylamine acetate, di-dodecylamine lactate, the acetate of aminoethyl-aminoethyl stearamide, dilauroyl triethylene tetramine diacetate, 1-aminoethyl-2-heptadecenyl imidazoline acetate; and quaternary salts, such as cetylpyridinium bromide, hexadecyl ethyl morpholinium chloride, and diethyl di-dodecyl ammonium chloride.

Examples of suitable nonionic surfactants or emulsifiers are condensation products of higher fatty alcohols with ethylene oxide, such as the reaction product of oleyl alcohol with 10 ethylene oxide units; condensation products of alkylphenols with ethylene oxide, such as the reaction product of isoctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethyleneglycol monobehenate, tricosaethyleneglycol dibehenate, polyhydric alcohol partial higher fatty acid esters such as sorbitan tristearate, ethylene oxide condensation products of polyhydric alcohol partial higher fatty acid esters, and their inner anhydrides (mannitol-anhydride, called Mannitan, and sorbitol-anhydride, called Sorbitan), such as glycerol monopalmitate reacted with 10 molecules of ethylene oxide, pentaerythritol monooleate reacted with 12 molecules of ethylene oxide, sorbitan monostearate reacted with 10-15 molecules of ethylene oxide, mannitan monopalmitate reacted with 10-15 molecules of ethylene oxide; long chain polyglycols in which one hydroxyl group is esterified with a higher fatty acid and other hydroxyl group is etherified with a low molecular alcohol, such as methoxypolyethylene glycol 550 monostearate (550 meaning the average molecular weight of the polyglycol ether). A combination of two or more of these surfactants may be used; e.g., a cationic may be blended with a nonionic or an anionic with a nonionic.

The foam control agent may further comprise one or more additives. Examples of additives include ethylene oxide/propylene oxide block copolymers, butylene oxide/propylene oxide block copolymers, ethylene oxide/butylene oxide block copolymers, waxes, or silicone-based materials. For other cleaning applications where surfactants cause foaming in cleaning steps Higher 2-alkyl substituted alcohols up to C32 can be used.

The foam control agent herein described can be used in semi-synthetic MWF or synthetic MWF comprising a Tall oil acid, ethanolamine, KOH, polyalkyl glycol lubricant, alcohol ethoxylates, sodium alkane sulfonate and water. The foam control agents described herein also help maintain transparency of a given MWF and are also biodegradable.

Examples

An experiment to test the efficacy of the presently disclosed foam control agent and others may be conducted as follows.

TABLE 1

| Raw Materials Used for Experiments | | | |
|---|---|---|---|
| Name | Producer/Vendor | Purpose | Chemistry and function |
| 2-butyl-1-octanol (2-BO) | Sigma Aldrich | Tested example | 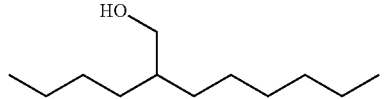 |
| 2-ethylhexanol (2-EH) | Sigma Aldrich | Tested example | 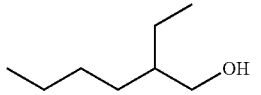 |
| 2-Propylheptanol (2-PH) | Sigma Aldrich | Tested example | 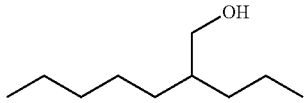 |
| AFE-1510 | Dow Corning | Comparative example | Silicone based foam control agent |
| ANTA L-61 | Sasol | Comparative example | EO/PO copolymer |
| FoamBan 3057 | Munzing Shanghai Co., Ltd | Comparative example | Petroleum distillates, solvent dewaxed light paraffinic and Petroleum distillates, solvent dewaxed heavy paraffinic |
| Isobutanol | The Dow Chemical | Comparative example | Isobutanol |
| C12-C14 linear alcohol | Sasol | Comparative example | C12-C14 linear alcohol |
| Exxal 13 | Exxonmobil | Comparative example | Iso-C13 Alcohol |
| SY-2 | Local MWF formulator | Commercial MWF product without foam control agent | Synthetic MWF, Toll oil acid + ethanolamine + KOH + water + poly alkyl glycol lubricant |

TABLE 1-continued

Raw Materials Used for Experiments

| Name | Producer/Vendor | Purpose | Chemistry and function |
|---|---|---|---|
| SY-6 | Local MWF formulator | Commercial MWF product without foam control agent | Semi-synthetic MWF, 40% mineral oil + tall oil acid + ethanolamine + Alcohol Ethoxylates + Sodium Alkane Sulfonate |
| BLC | AFTON | Commercial MWF product without foam control agent | Semi-synthetic MWF, 20-30% mineral oil + 10-19.9% tall oil, monoethanolamine salt + 10-19.9% long-Chain alkyl alkanol amide + 1-5% Hexylene glycol + 1-5.0% ethanol, 2-amine + water to 100% |

Test 1—Antifoaming Shake Test

A screening shake test was first conducted to evaluate the presently disclosed foam control agents and some comparative examples. The concentrated commercial metal working fluid BLC was diluted 20 times using DI water. The tested defoamer was then added at 0.05% (500 ppm) to prepare 2 grams of solution in an 8 ml vial. The vial was then shaken for 1 hour in a lab shaker at a high-speed setting and the results of this test were recorded in Table 2 below.

TABLE 2

Vial Shaking Screening Results

| Example No. | MWF type | Foam Control Agent | Foaming appearance |
|---|---|---|---|
| Comparative Example 1 | BLC | No | Significant Foam |
| Comparative Example 2 | BLC | AFE-1510 | Little Foam |
| Example 1 | BLC | 2-PH | Little Foam |
| Example 2 | BLC | 2-EH | Little Foam |
| Example 3 | BLC | 2-BO | Little Foam |

Test 2—Defoaming Shake Test

The tested examples and comparative examples were then further evaluated by mixing them with other common commercial MWF formulations. Samples shown in Table 3 were prepared by dissolving 0.100 g foam control agent into 9.900 g semi-synthetic/synthetic MWF and shaking the mixture to give a homogeneous solution. A specially designed cylinder was used to evaluate the extent of foaming. The distance between the 0 mL mark and the 250 mL mark of the cylinder is 20-21.5 cm, and the distance between the 250 mL mark and the bottom of the stopper is approximately 4 to 6 cm. 2.50 g soluble oil or semi-synthetic MWF concentrate was then added into the 250 mL cylinder containing 95 mL of a standard 25 ppm hard water. After closing the cylinder with a stopper, the cylinder was inverted 30 times within 1 minute and the initial foam at time 0 seconds, as well as the foam level at 30 seconds, at 1 min, at 2 min and at 3 min was recorded.

The standard hard water (25 ppm) utilized for this test was prepared by adding anhydrous calcium chloride (0.045 g) and magnesium chloride hexahydrate (0.023 g) in DI water to prepare 2.0 L of standard hard water at 25 ppm.

TABLE 3

Standard Cylinder Inversion Results

| Example No. | MWF type | Defoamer | Appearance after 24 h | Foaming after upside down shaking, mL | | | | |
|---|---|---|---|---|---|---|---|---|
| | | | | Initial | 30 s | 60 s | 120 s | 180 s |
| Comparative example 1 | SY-2 | N/A | Transparent | 175 | 175 | 170 | 170 | 170 |
| Example 2 | SY-2 | 2-PH | Transparent | 130 | 95 | 10 | 0 | 0 |
| Example 3 | SY-2 | 2-BO | Transparent | 125 | 110 | 72 | 20 | 5 |
| Example 4 | SY-2 | 2-EH | Transparent | 160 | 140 | 105 | 45 | 5 |
| Comparative example 5 | SY-2 | ANTA L-61 | Transparent | 145 | 140 | 100 | 25 | 20 |
| Comparative example 6 | SY-2 | FoamBan 3057 | Hazy | 130 | 95 | 35 | 5 | 5 |
| Comparative example 7 | SY-2 | Isobutanol | Transparent | 150 | 150 | 140 | 75 | 50 |
| Comparative example 8 | SY-2 | C12-C14 linear alcohol | Transparent | 170 | 170 | 100 | 25 | 23 |
| Comparative example 9 | SY-2 | Exxal 13 | Hazy | 140 | 135 | 110 | 25 | 20 |
| Comparative example 10 | SY-6 | N/A | Transparent | 170 | 170 | 170 | 170 | 170 |
| Example 11 | SY-6 | 2-BO | Transparent | 135 | 125 | 115 | 110 | 110 |
| Comparative Example 12 | SY-6 | ANTA L-61 | Transparent | 180 | 180 | 170 | 170 | 170 |
| Comparative Example 13 | SY-6 | FoamBan 3057 | Hazy | 160 | 155 | 150 | 140 | 140 |
| Comparative Example 14 | SY-6 | Isobutanol | Transparent | 145 | 140 | 135 | 130 | 130 |
| Comparative Example 15 | SY-6 | $C_{12}$-$C_{14}$ linear alcohol | Hazy | 135 | 135 | 130 | 130 | 130 |
| Comparative Example 16 | SY-6 | Exxal 13 | Hazy | 145 | 140 | 140 | 140 | 140 |

As shown in Table 3, in a typical synthetic MWF formulation, 1% dosage of the three tested branched alcohols helped increase the foaming collapse compared to the blank sample. 2-PH displayed the best defoaming performance and was stable in the formulation compared to the existing non-silicone defoamer in the market. In a typical semi-synthetic MWF containing higher content high foaming emulsifiers, 2-BO presented better defoaming property compared to recognized foam control agent FoamBan 3057 and 2-BO was also more stable in the formulation and maintained transparency.

The invention claimed is:

1. A method of controlling foam for metal working fluids comprising the step of adding a foam control agent to the metal working fluid, wherein the agent comprises 2-butyl-1-octanol, or 2-propylheptanol.

2. The method of claim 1, wherein at least one other foam control agent or hydrophobic material is used.

3. The method of claim 1, wherein the metal working fluid, when combined with the foam control agent, is transparent.

* * * * *